UNITED STATES PATENT OFFICE 2,228,415

AZO DYES

Chiles E. Sparks, Stewart C. Hussey, William B. Reynolds, and Swanie S. Rossander, Wilmington, Del., assignors to E. I. du Pont de Nemours & Company, Wilmington, Del., a corporation of Delaware No Drawing. Application June 4, 1938, Serial No. 211,798

11 Claims. (Cl. 260—145)

A. This invention relates to new azo dyes of the type whose properties are improved by aftertreatment with formaldehyde. The invention relates to the dyes both before and after such treatment.

B. It was long ago proposed to treat certain azo dyes on the fiber with formaldehyde to improve the properties thereof. Examples thereof are shown in U. S. Patents 1,150,656, 1,169,329, 1,090,379, 1,125,050, 1,087,430, and 1,082,925. Despite the existence in the art of such colors, however, the dye industry has gone more and more to the use of two bath processes in which the one intermediate is applied to the fiber in one bath and the other added in the second bath, or in which the intermediates are stabilized against each other in a paste and then reacted on the fiber, because such colors have properties superior to those which are possessed by the types of direct, formaldehyde-treated dyes of these references. It is, however, highly desirable to apply complete dyes directly provided the complete color has the requisite brilliance and fastness.

C. It is, accordingly, an object of this invention to prepare direct dyes of high quality and fastness when aftertreated with formaldehyde.

D. The objects of the invention are accomplished, generally speaking, by azotizing a compound represented by the formula:

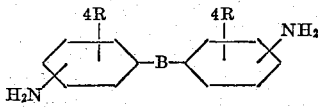

in which B is one of the group of radicals consisting of

—CONH—, —NHCONH—, —NHCSNH—,

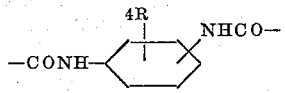

—CONH(CH$_2$)$_m$NHCO—, NH, S, O, (CH$_2$)$_m$, —HC=CH—, and

where $m$ is a digit, and in which each R is one of the group consisting of hydrogen, alkyl, aryl, aralkyl, halogen, alkoxy, nitro, sulfonic carboxylic, and CN; coupling the azotized compound to one of the following components: an amino-phenyl-pyrazolone; a 1-amino-naphthalene represented by the formula:

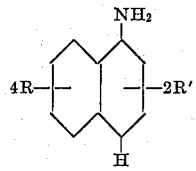

in which each R' is one of the group consisting of hydrogen, alkyl, and alkoxy, and the —H indicates that the indicated position is not substituted by R or R'; an amino-benzene represented by the formula:

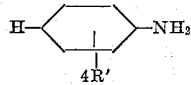

a 1-amino-naphthalene sulfonic acid represented by the formula:

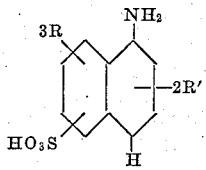

and an amino-naphthol-mono-sulfonic acid represented by the formula

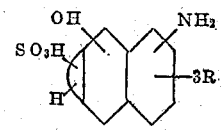

in which it is preferred that the nucleus shall contain only one sulfonic acid group. The compound so formed is azotized and coupled to a 1,3-dihydroxy-benzene of the formula:

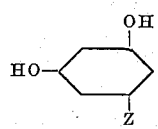

where Z is one of the following group: H, OH, alkyl, alkoxy, amino, SO$_3$H, COOH, halogen, and CN; dyeing appropriate material therewith and reacting the product on the material with formaldehyde. The dyes untreated with formaldehyde are also claimed to the extent that they are new.

Examples of the pyrazolone type components described in the preceding paragraph are:

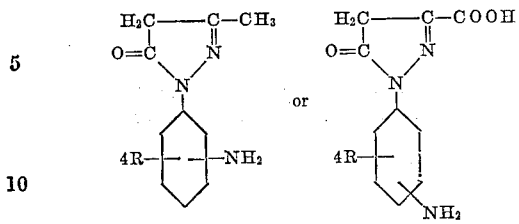

The preferred end component is 1,3-dihydroxy-benzene. The completed compounds have the type formula before the formaldehyde treatment: A←Y←X→Y→A in which X is the component first described in the preceding paragraph; Y is the component next described, and A is the compound last described in said paragraph, of which class resorcin is preferred.

Where a symbol such as 4R is used, it means that the indicated number of members of the group R appear as substituents in the nucleus.

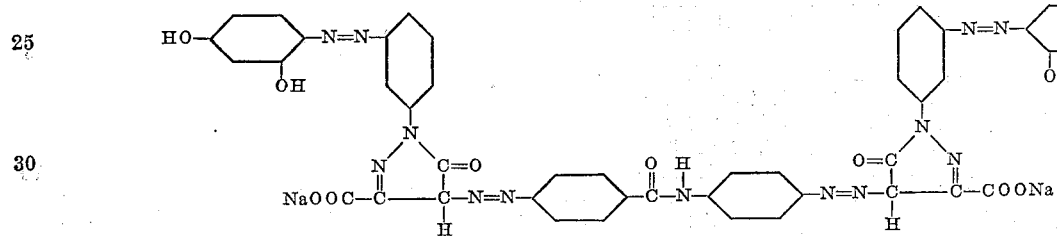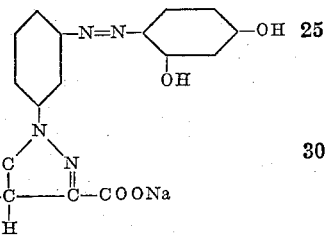

For example, it could mean three hydrogens and a methyl (both being in the group R); or two alkyls, a halogen, and a hydrogen; or any other combination of members of that group. To have a small number of non-hydrogen substituents is in accordance with the better practice because of cost and complexity in manufacture. Where R appears in one ring of a naphthalene nucleus and R' in the other, it is to be understood that each said symbol appears only in the indicated half of the nucleus. On the other hand, where a symbol is shown alone in a naphthalene nucleus, it may appear at any replaceable position.

E. The following examples illustrate but do not limit the invention:

EXAMPLE I

Slurry 114 parts of 4-(4'-amino-benzoyl) amino-1-amino-benzene and 4000 parts of water. Add 91 parts of 100% hydrochloric acid as a 30% solution and heat to 35–40° C. for complete solution. Ice to 0° C. Add 69 parts of 100% sodium nitrite as a 30% solution. Tetrazotize at 0–5° C. for ½ hr. with a faint excess nitrite. The soluble tetrazo should be distinctly acid to Congo Red paper.

Slurry 230 parts of 1-(3'-amino-phenyl)-5-pyrazolone-3-carboxylic acid and 5000 parts of water. Add 106 parts of sodium carbonate. Stir until complete solution is obtained. The solution should be alkaline to Brilliant Yellow paper. Add 265 parts of sodium carbonate and stir until dissolved. Ice the solution to 0° C.

Add the solution of the tetrazo slowly to the solution of 1-(3'-amino-phenyl)-5-pyrazolone-3-carboxylic acid. Maintain a temperature of 0–5° C. There should be an excess of 1-(3'-amino-phenyl)-5-pyrazolone-3-carboxylic acid as shown by spotting with 4,4'-diamino-3,3'-dimethoxy-diphenyl-tetrazo. There should be no test for the tetrazo by spotting with an alkaline solution of 1-amino-8-naphthol-3,6-disulfonic acid (H-acid).

Stir the yellow-orange dye suspension for one hour. Heat the mixture to 70–80° C. Salt 5% with sodium chloride and filter.

Stir the filter cake with 4000 parts of water until a smooth slurry is obtained. Ice to 10° C. Add 110 parts of 100% hydrochloric acid as a 30% solution. Add 69 parts of 100% sodium nitrite as a 30% solution. Tetrazotize at 10–12° C. for one hour with a distinct excess nitrite.

Stir 132 parts of 1,3-dihydroxy benzene and 2500 parts of water to complete solution. Ice to 0° C. and add 215 parts of sodium carbonate.

Add the tetrazo slowly to the alkaline solution of 1,3-dihydroxy benzene. There should be an excess 1,3-dihydroxy-benzene as shown by spotting with 4,4'-diamino-3,3'-dimethoxy-diphenyl tetrazo. Stir one hour after the addition of the tetrazo. Heat the suspension to 70–80° C. Salt slowly 10% with sodium chloride. Filter. Dry at 80–85° C. in an oven. The dry powder is a red orange in appearance.

The probable formula of the dye is:

The dye may be dyed on the fiber and after-treated as follows:

Dissolve 0.2 gram of the product in 50 ml. water at 190–200° F., adding 0.4 gram of sodium carbonate to assist the solution. Dilute with stirring to a total volume of 500 ml. with water at approximately 160° F. Add 40 ml. of a 10% solution of Glauber's salt. Wet out a 10 gram piece of rayon with water, squeeze partially dry, and enter this into the dye bath. Raise the temperature of the dye bath to 180–190° F. in the course of fifteen minutes. Hold the dye bath at that temperature for one hour. Stir the dyeings at frequent intervals during this time. At the end of one hour remove the dyeing and rinse in cold water.

*After-treatment in a fresh bath*

To 500 ml. of water at 130–140° F. add the rinsed dyeing from the above operation. Then add approximately 10 ml. of 10% formaldehyde (25 ml. of approximately 37% formaldehyde by weight, diluted to 250 cc. with water). Hold at this temperature for twenty minutes. Remove the dyeing, rinse, and dry.

*After-treatment in the dye bath*

An alternative after-treating process, which is the preferred procedure because of its economy and ease of application, is carried out as follows:

At the end of the dyeing period add to the dye bath 10 ml. of 10% formaldehyde as in the preceding example at bath temperature. Remove the dyeings after twenty minutes. Rinse and dry.

A dyeing with a bright orange shade is obtained which shows excellent fastness to washing and yields white discharges.

It is understood that we are not limiting ourselves to the exact conditions of the above operations which may be varied within reasonable limits as will be readily recognized by one skilled in the art without essentially altering the dyeing and fastness properties of the subject product.

EXAMPLE II

Slurry 114 parts of 3-(4'-amino-benzoyl-amino)-1-amino benzene and 4000 parts of water. Add 91 parts of 100% hydrochloric acid as a 30% solution and warm to 35-40° C. for complete solution. Ice to 0° C. Add 69 parts of 100% sodium nitrite as a 30% solution. Tetrazotize at 0-5° C. for one-half hour with a faint excess nitrite. The soluble tetrazo should be distinctly acid to Congo Red paper.

Slurry 230 parts of 1-(3'-amino-phenyl)-5-pyrazolone-3-carboxylic acid and 5000 parts of water. Add 106 parts of sodium carbonate. Stir until complete solution is obtained. The solution should be alkaline to Brilliant Yellow paper. Add 265 parts of sodium carbonate and stir until dissolved. Ice the solution to 0° C.

Add the solution of the tetrazo slowly to the alkaline solution of the 1-(3'-amino-phenyl)-5-pyrazolone-3-carboxylic acid. Maintain a temperature of 0-5° C. There should be an excess of 1-(3'-amino-phenyl)-5-pyrazolone-3-carboxylic acid as shown by spotting with 4,4'-diamino-3,3'-dimethoxy-diphenyl tetrazo. There should be no test for tetrazo by spotting with an alkaline solution of 1-amino-8-naphthol-3,6-disulfonic acid (H-acid). Stir the yellow suspension for one hour. Heat the mixture to 70-80° C. Salt 5% with sodium chloride and filter.

Stir the filter cake with 4000 parts of water until a smooth slurry is obtained. Ice to 10° C. Add 110 parts of 100% hydrochloric acid as a 30% solution. Add 69 parts of 100% sodium nitrite as a 30% solution. Tetrazotize at 10-12° C. for one hour with strong excess nitrite.

Stir 132 parts of 1,3-dihydroxybenzene and 2500 parts of water to a complete solution. Ice to 0° C. and add 215 parts of sodium carbonate.

Add the tetrazo slowly to the alkaline solution of 1,3-dihydroxy benzene. There should be an excess of 1,3-dihydroxy benzene. Stir one hour after the addition of the tetrazo. Heat the suspension to 70-80° C. Salt slowly 10% with sodium chloride. Filter. Dry at 80-85° C. in an oven.

The dry powder is a yellow orange in appearance. The probable formula of the dye is:

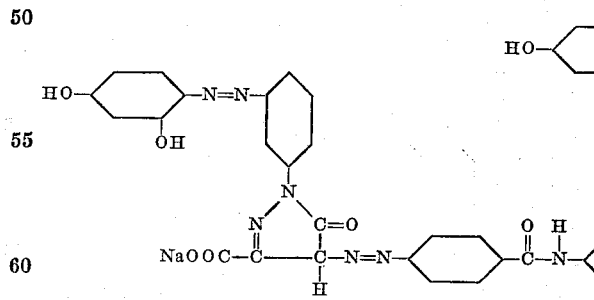

The product may be dyed and after-treated in a manner analogous to that used in Example I. A dyeing with a bright gold shade is obtained which shows excellent fastness to washing and yields white discharges.

EXAMPLE III

Slurry 187 parts of 4,4'-diamino-stilbene-2,2'-disulfonic acid and 4000 parts of water. Add 42 parts of sodium hydroxide and stir until complete solution is obtained. The solution should be slightly alkaline to Brilliant Yellow paper. Ice to 10° C. Add 128 parts of 100% hydrochloric acid as a 30% solution. Add 69 parts of 100% sodium nitrite as a 30% solution. Tetrazotize at 10-12° C. for forty-five minutes with a slight excess nitrite. Remove the excess nitrite just before coupling.

Slurry 234 parts of 1-amino-naphthalene-6-sulfonic acid and 4000 parts of water. Add 55 parts of sodium carbonate or a sufficient quantity to obtain a complete solution which is faintly alkaline to Brilliant Yellow paper. After stirring to insure complete solution a sufficient quantity of acetic acid is added to make the solution faintly acid to litmus paper.

Ice the tetrazo to 0° C. Add 135 parts of hydrated sodium acetate. Add the neutral solution of 1-amino-naphthalene-6-sulfonic acid. The suspension should be neutral to Congo Red paper and acid to litmus paper. Stir fifteen to twenty hours to insure complete coupling allowing the temperature to rise to 20-30° C. There should be a distinct test for 1-amino-naphthalene-6-sulfonic acid. Heat the suspension to 70-80° C. Salt 5% with sodium chloride. Filter.

Slurry the filter cake and 3000 parts of water. Ice to 12-15° C. Add 110 parts of 100% hydrochloric acid as a 30% solution. Add 69 parts of 100% sodium nitrite as a 30% solution. Tetrazotize for one and one-half hours with a distinct excess nitrite at 15-20° C.

Dissolve 132 parts of 1,3-dihydroxy benzene in 2000 parts of water. Ice to 0° C. Add 215 parts of sodium carbonate.

Add the tetrazo slowly to the alkaline solution of 1,3-dihydroxy-benzene. Stir one hour after the addition. There should be a distinct excess of 1,3-dihydroxy benzene and the suspension should be alkaline to Brilliant Yellow paper. Heat to 70-80° C. Salt 10% with sodium chloride. Filter. Dry at 80-85° C. in an oven. The dry powder is a blue black in appearance and when dyed and after-treated with formaldehyde gives a blue violet shade. This product shows excellent washing fastness and good discharge properties. The probable formula is:

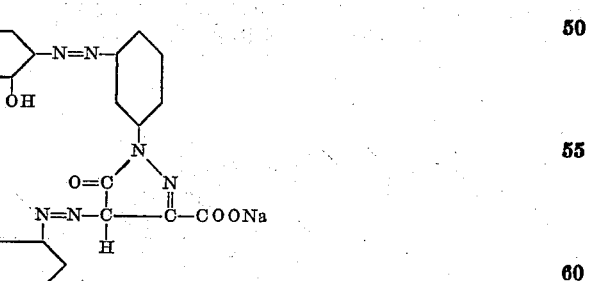

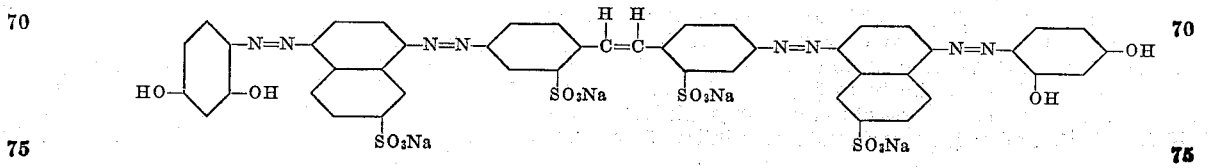

Example IV

Slurry 114 parts of 4-(4'-amino-benzoyl)-amino-1-amino-benzene with 4000 parts of water. Add 91 parts of 100% hydrochloric acid as a 30% solution. Warm to 35–40° C. for complete solution. Ice to 0° C. Add 69 parts of 100% sodium nitrite as a 30% solution. Tetrazotize at 0–5° C. for 20–30 minutes with a slight excess nitrite.

Slurry 250 parts of 1-amino-5-naphthol-7-sulfonic acid and 4000 parts of water. Add 106 parts of sodium carbonate and stir for complete solution. The solution should be alkaline to Brilliant Yellow paper. Ice to 0° C. Add 265 parts of sodium carbonate.

Add the tetrazo slowly to the coupling solution. Maintain a temperature of 0–5° C. and a strong alkalinity on Brilliant Yellow paper. Stir one hour after the addition of the tetrazo. There should be an excess of 1-amino-5-naphthol-7-sulfonic acid. Heat the mixture to 70–80° C. Salt slowly 5% with sodium chloride and filter.

Slurry the filter cake and 4000 parts of water until well broken up. Ice to 10° C. Add 110 parts of 100% hydrochloric acid as a 30% solution. Add 69 parts of 100% sodium nitrite as a 30% solution. Tetrazotize at 10–15° C. for one hour with a distinct excess nitrite.

Dissolve 132 parts of 1,3-dihydroxy benzene in 2500 parts of water. Ice to 0° C. Add 215 parts of sodium carbonate.

Add the tetrazo slowly to the alkaline 1,3-dihydroxy benzene solution. Maintain a temperature of 0–5° C., a distinct excess of 1,3-dihydroxy benzene and Brilliant Yellow alkalinity. Stir one hour. Salt slowly 5% with sodium chloride. Filter. Dry at 80–85° C. in an oven. The dry powder is a blue-brown in appearance and when dyed and after-treated as in Example I gives a maroon shade showing excellent washing and discharge properties. The probable formula is:

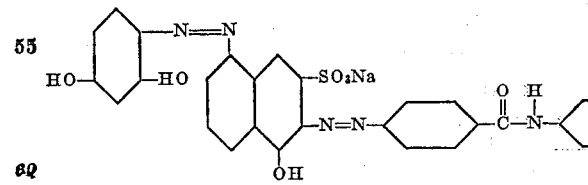

Example V

Slurry 73 parts of di-(4-amino-phenyl) urea with 1500 parts of water. Add 55 parts of 100% hydrochloric acid as a 30% solution. Stir until dissolved. Ice to 0° C. Add 42 parts of 100% sodium nitrite. Tetrazotize for one-half hour with a slight excess nitrite.

Stir 148 parts of 2-amino-8-naphthol-6-sulfonic acid and 2000 parts of water. Add 65 parts of sodium carbonate to dissolve. Ice to 0° C. Add 130 parts of sodium carbonate.

Add the tetrazo slowly to the coupling solution. Maintain an excess of 2-amino-8-naphthol-6-sulfonic and sodium carbonate alkalinity. Stir one hour. Heat to 70–80° C. Salt 5% with sodium chloride, stir and filter.

Slurry the filter cake and 3000 parts of water to a smooth slurry. Ice to 5–10° C. Add 66 parts of 100% hydrochloric acid as a 30% solution. Tetrazotize at 5–10° C. for one hour with strong excess nitrite.

Dissolve 82 parts of 1,3-dihydroxy benzene in 1500 parts of water. Ice to 0° C. Add 150 parts of sodium carbonate.

Add the tetrazo slowly to the alkaline solution of 1,3-dihydroxy benzene. Stir one hour. The suspension should be alkaline to Brilliant Yellow paper. Heat to 70–80° C. Salt slowly 10% with sodium chloride. Filter. Dry at 80–85° C. in an oven. The product is a black powder which when dyed and after-treated as in Example I gives deep brown shades with excellent washing fastness and good discharge properties.

The probable formula is:

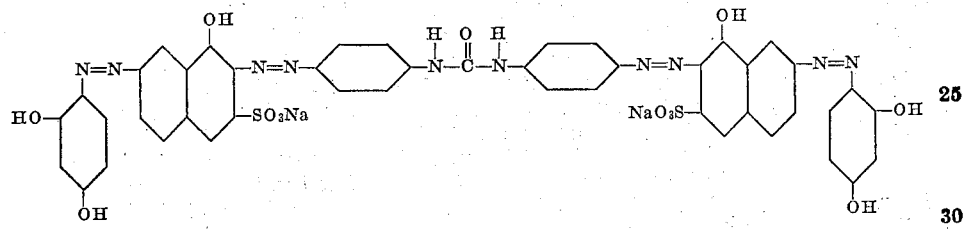

Example VI

Slurry 90 parts of 1,2-di(4'-amino-benzoyl-amino)-ethane and 2000 parts of water. Add 55 parts of 100% hydrochloric acid as a 30% solution. Add 42 parts of 100% sodium nitrite as a 30% solution. Tetrazotize at 0–5° C. for one-half hour with a slight excess nitrite.

Slurry 148 parts of 1-amino-5-naphthol-7-sulfonic acid with 2500 parts of water. Add 65 parts of sodium carbonate. Stir to complete solution. Ice to 0° C. Add 127 parts of sodium carbonate.

Add the tetrazo slowly to the alkaline solution. Stir one hour. The suspension should be alkaline to Brilliant Yellow and there should be present an excess of 1-amino-5-naphthol-7-sulfonic acid. Heat to 70–80° C. Salt 10% with sodium chloride. Filter.

Slurry the filter cake with 3000 parts of water. Ice to 10° C. Add 66 parts of 100% hydrochloric acid as a 30% solution. Add 42 parts of 100% sodium nitrite as a 30% solution. Tetrazotize at 10–15° C. for one hour with strong excess nitrite.

Dissolve 80 parts of 1,3-dihydroxy-benzene in 2000 parts of water. Ice to 0° C. Add 150 parts of sodium carbonate.

Add the tetrazo slowly to the alkaline solution of 1,3-dihydroxy benzene. Stir one hour. There should be an excess of 1,3-dihydroxy benzene and the suspension should be alkaline to Brilliant Yellow paper. Heat to 60–70° C. Salt slowly 10% with sodium chloride. Filter. Dry at 80–85° C. in an oven. The brown powder when dyed and after-treated with formaldehyde yields a red brown shade with excellent washing fastness and good discharge properties.
The probable formula is:

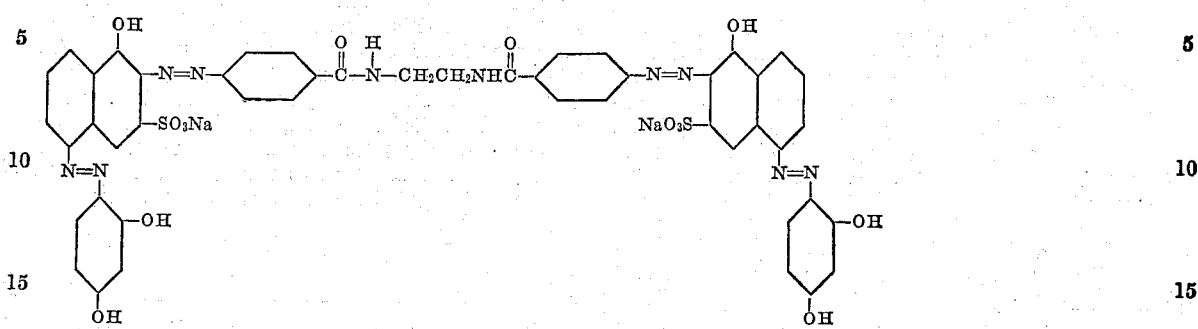

EXAMPLE VII

Slurry 121 parts of di-(3-amino-phenyl)-urea with 4000 parts of water. Add 91 parts of 100% hydrochloric acid as a 30% solution. Stir to complete solution. Ice to 0° C. Add 69 parts of 100% sodium nitrite as a 30% solution. Tetrazotize at 0–5° C. for one-half hour with a slight excess nitrite.

Stir 251 parts of 2-amino-5-naphthol-7-sulfonic acid and 5000 parts of water. Add 106 parts of sodium carbonate. Stir to complete solution. Add 265 parts of sodium carbonate and ice to 0° C.

Add the tetrazo slowly to the alkaline coupling mixture. Stir one hour. The suspension should be strongly alkaline to Brilliant Yellow and there should be a distinct excess of 2-amino-5-naphthol-7-sulfonic acid. Heat to 60–70° C. Salt 10% with sodium chloride and filter.

Stir the filter cake and 4000 parts of water to a smooth slurry. Add 110 parts of 100% hydrochloric acid as a 30% solution. Ice to 10° C. Add 69 parts of 100% sodium nitrite as a 30% solution. Tetrazotize for one hour at 10–15° C.

Dissolve 132 parts of 1,3-dihydroxy benzene in 2500 parts of water. Ice to 0° C. Add 215 parts of sodium carbonate.

Add the tetrazo slowly to the alkaline solution of the 1,3-dihydroxy benzene. Stir one hour. There should be a distinct excess of 1,3-dihydroxy benzene and the suspension should be alkaline to Brilliant Yellow. Heat to 60–70° C. Salt 10% with sodium chloride. Filter. Dry at 80–85° C. in an oven. The dry brown powder when dyed and after-treated as in Example I gives a yellow bordeaux shade with excellent washing fastness and good discharge properties.
The probable formula is:

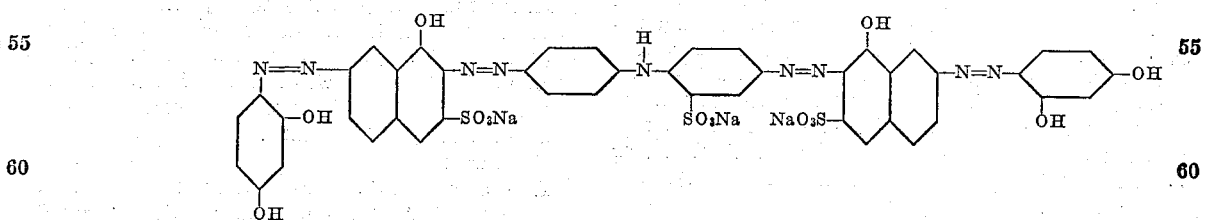

EXAMPLE VIII

Slurry 140 parts of 4,4'-diamino-diphenyl-amine-2-sulfonic acid with 4000 parts of water. Add 91 parts of 100% hydrochloric acid as a 30% solution. Filter if not completely dissolved. Ice to 0° C. Add 69 parts of 100% sodium nitrite as a 30% solution. Tetrazotize at 0–5° with a slight excess of nitrite for 20–30 minutes.

Slurry 250 parts of 2-amino-8-naphthol-6-sulfonic acid and 5000 parts of water. Add 106 parts of sodium carbonate. Stir until dissolved. Ice to 0° C. Add 265 parts of sodium carbonate.

Add the tetrazo slowly to the alkaline coupling solution. Stir one hour after the addition of the tetrazo. The suspension should be strongly alkaline to Brilliant Yellow and should show a distinct excess of 2-amino-8-naphthol-6-sulfonic acid. Heat to 60–70° C. Salt 20–25% with sodium chloride. Filter.

Stir the filter cake and 4000 parts of water until a smooth slurry is obtained. Ice to 5° C. Add 110 parts of 100% hydrochloric acid. Add 69 parts of 100% sodium nitrite as a 30% solution. Tetrazotize at 5–10° C. for one hour.

Dissolve 132 parts of 1,3-dihydroxy benzene in 2500 parts of water. Ice to 0° C. Add 215 parts of sodium carbonate.

Add the tetrazo slowly to the alkaline solution of 1,3-dihydroxy benzene. Stir one hour after the addition. There should be a distinct excess of 1,3-dihydroxy benzene and the suspension should be alkaline to Brilliant Yellow. Heat to 60–70° C. Salt 15% with sodium chloride. Filter. Dry at 80–85° C. in an oven. The dry black powder when dyed and after-treated as in Example I gives a black shade with excellent washing fastness.
The probable formula is:

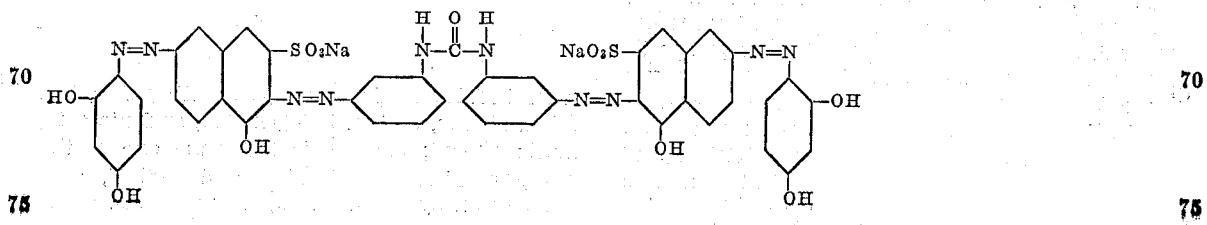

F. It is understood that in the above examples we are not limited to the methods described for their preparation. Modifications well known to the art can be applied with satisfactory results.

Likewise similar products can be prepared by the above methods as suitable modifications thereof.

G. The following table discloses additional examples of the subject type. It is understood that we are not limited in our claims to the examples listed. The products listed in the table are prepared by methods analogous to those listed above, the most applicable method being easily ascertained by one skilled in the art for any specific example.

in the so-called diazo process, is unnecessary with these colors. There are three baths necessary in the so-called diazo process and only one is necessary in this process, although as hereinbefore mentioned two baths can be used. In the case of diazo colors a shade change occurs when the development takes place on the fiber. This change is undesirable and makes it difficult for the dyer to apply his shades accurately. These dyes present a solution to that problem because the formaldehyde after-treatment produces prac-

| Example No. | Combination | Shade |
|---|---|---|
| 9 | 1,3-di(4'-amino-benzoyl-amino)benzene===>(1-(3'-amino-phenyl)-pyrazolone-3-carboxylic acid)₂===>(1,3-dihydroxy benzene)₂. | Yellow. |
| 10 | 3-(4'-amino-benzoyl-amino)-1-amino-benzene===>(2-amino-8-naphthol-6-sulfonic acid)₂===>(1,3-dihydroxy benzene)₂. | Red brown. |
| 11 | 4-(4'-amino-benzoyl-amino)-3-methyl-1-amino-benzene===>(1-amino-5-naphthol-7-sulfonic acid)₂===>(1,3-dihydroxy benzene)₂. | Maroon. |
| 12 | 4-(4'-amino-benzoyl-amino)-3-methyl-1-amino-benzene===>(2-amino-8-naphthol-6-sulfonic acid)₂===>(1,3-dihydroxy benzene)₂. | Do. |
| 13 | 3-(4'-amino-benzoyl-amino)-1-amino-benzene===>(2-amino-5-naphthol-7-sulfonic acid)₂===>(1,3-dihydroxy benzene)₂. | Scarlet. |
| 14 | 1,2-di(4'-amino-benzoyl-amino)ethane===>(2-amino-8-naphthol-6-sulfonic acid)₂===>(1,3-dihydroxy benzene)₂. | Red brown. |
| 15 | 1,3-di(4'-amino-benzoyl-amino)benzene-4-sulfonic acid===>(1-(3'-amino-phenyl)-3-methyl-5-pyrazolone)₂===>(1,3-dihydroxy-benzene)₂. | Yellow. |
| 16 | 4-(4'-amino-benzoyl-amino)-3-chloro-1-amino-benzene===>(1-(3'-amino-phenyl)-5-pyrazolone-3-carboxylic acid)₂===>(1,3-dihydroxy benzene)₂. | Orange. |
| 17 | 4-(4'-amino-benzoyl-amino)-2-methyl-5-methoxy-1-amino benzene===>(2-amino-5-naphthol-7-sulfonic acid)₂===>(1,3-dihydroxy benzene)₂. | Maroon. |
| 18 | 4-(4'-amino-benzoyl-amino)-2-methyl-5-methoxy-1-amino benzene===>(1-(3'-amino-phenyl)-5-pyrazolone-3-carboxylic acid)₂===>(1,3-dihydroxy benzene)₂. | Scarlet. |
| 19 | Di(4-amino-phenyl)urea===>(1-amino-5-naphthol-7-sulfonic acid)₂===>(1,3-dihydroxy benzene)₂. | Red brown. |
| 20 | Di (3-amino-phenyl)urea===>(2-amino-8-naphthol-6-sulfonic acid)₂===>(1,3-dihydroxy benzene)₂. | Do. |
| 21 | Di(4-amino-phenyl)thio-urea===>(2-amino-8-naphthol-6-sulfonic acid)₂===>(1,3-dihydroxy benzene)₂. | Brown. |
| 22 | Di(3-amino-phenyl) urea===>(1-amino-5-naphthol-7-sulfonic acid)₂===>(1,3-dihydroxy benzene)₂. | Red. |
| 23 | 4,4'-diamino-diphenyl-amine===>(2-amino-8-naphthol-6-sulfonic acid)₂===>(1,3-dihydroxy benzene)₂. | Black. |
| 24 | 4,4'-diamoni-diphenyl-amine-2-sulfonic acid===>(1-amino-2-methoxy-naphthalene-6-sulfonic acid)₂===>(1,3-dihydroxy-benzene)₂ | Blue. |
| 25 | 4,4'-diamino-stilbene-2,2'-disulfonic acid===>(1-amino-3-methyl-benzene)₂===>(1,3-dihydroxy benzene)₂. | Red brown. |
| 26 | 4,4'-diamino-3,3'-dimethyl-diphenyl-methane===>(1-(3'-amino-phenyl)-5-pyrazolone-3-carboxylic acid)₂===>(1,3-dihydroxy-benzene)₂. | Orange. |
| 27 | 3-(4'-amino-benzoyl-amino)-1-amino-benzene===>(1-(3'-amino-phenyl)-5-pyrazolone-3-carboxylic acid)₂===>(1-methyl-2,4,6-trihydroxy-benzene)₂ | Yellow. |
| 28 | 4-(4'-amino-benzoyl-amino)-1-amino-benzene===>(1-amino-5-naphthol-7-sulfonic acid)₂===>(1,3-dihydroxy-5-methoxy benzene)₂. | Maroon. |
| 29 | 3-(4'-amino-benzoyl-amino)-1-amino-benzene===>(1-(3'-amino-phenyl)-5-pyrazolone-3-carboxylic acid)₂===>(1,3-dihydroxy-benzene-5-sulfonic acid)₂. | Yellow. |

H. Deeper shades with better light fastness are produced by after-treatment of these colors with copper salts. This after-coppering operation may be carried out by coppering before, with, or after the formaldehyde treatment. A 5% solution of hydrated copper sulfate produces satisfactory results. This double after-treatment operation may be done either in the dye bath or in a fresh bath as detailed in Example I. It may be carried out by adding the formaldehyde solution as above and, after an interval of twenty minutes, the copper sulfate. The treatment is continued for twenty minutes. The dyeings are then removed, rinsed, and dried. Closely similar results are obtained by reversing the order of adding the reagents, that is by adding the copper sulfate solution first, treating for twenty minutes and then adding the formaldehyde solution. After twenty minutes the dyeings are removed, rinsed and dried.

I. In the trade there is a demand for colors which are fast to washing, which will not stain attached undyed fibers, and which can be applied by a process more simple than the so-called diazo process. These dyes are an answer to this demand of the trade. They have washing fastness equal, and in many cases much superior, to the so-called diazo colors. This advantage is very great from a standpoint of cost and ease of application. Equal or superior fastness can be obtained with less effort and less material expense on the part of the dyer. The azotization and development of the dyes on the fiber, as is required tically no change in shade. These colors also have outstanding discharge properties, being in that respect at least equal, and in many instances far superior, to the dyes of equivalent shades now on the market.

J. The dyes can be applied to widely different materials, such as silk, wool, and leather, but they are of particular importance in connection with the dyeing of cellulose and regenerated cellulose. Some of the cellulose esters and ethers can also be dyed with highly satisfactory results.

K. As many apparently widely different embodiments of the invention may be made without departing from the spirit and scope thereof, it is to be understood that we do not limit ourselves to the specific embodiments thereof except as defined in the appended claims.

We claim:

1. A compound represented by the formula: [A←Y←X→Y→A] formaldehyde in which each A is a radical of the formula:

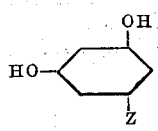

wherein Z is one of the group consisting of H, OH, alkyl, alkoxy, amino, halogen, CN, sulfonic acid, and carboxyl; each Y is the same one of the group consisting of a diazotized radical, connected to A by the azo group, from the class consisting of an amino-phenyl-pyrazolone; a compound represented by the formula:

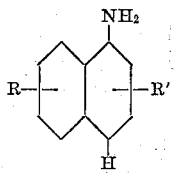

a compound represented by the formula:

a compound represented by the formula:

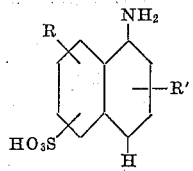

and a compound represented by the formula:

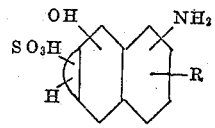

and wherein X is a tetrazotized radical of a diamine, coupled to Y through the azo groups, represented by the formula:

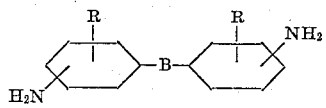

in which formulas R means one or more of a group consisting of hydrogen, alkyl, aryl, aralkyl, halogen, alkoxy, nitro, sulfonic, carboxylic, and CN, and R' means one or more of a group consisting of hydrogen, alkyl, and alkoxy, and the symbol H as applied to an aryl nucleus means that that position is unsubstituted by R and R', and B is one of the group of radicals consisting of —CONH—, —NHCONH—, NHCSNH—,

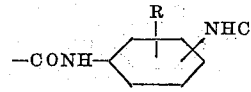

—CONH(CH$_2$)$_m$NHCO—, NH, S, O, (CH$_2$)$_m$, —HC=CH—, and N—N, where $m$ is a small digit other than zero.

2. The compounds of claim 1 in which $m$ is 1 or 2.

3. The compounds represented by the formula: A←Y←X→Y→A in which A and X have the meaning set for in claim 1 and Y is an amino-phenyl-pyrazolone.

4. The compounds of claim 1 in which the end component is resorcin.

5. The compounds represented by the formula: A←Y←X→Y→A in which the members have the meaning set forth in claim 1.

6. The coppered compounds of claim 1.

7. The coppered compounds of claim 1 where A is resorcin.

8. The compounds of the type A←Y←X→Y→A, where A is resorcin, Y is an amino-phenyl-pyrazolone and X is

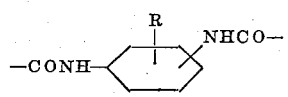

and B is one of a group of radicals consisting of —CONH—, —NHCONH—, —NHCSNH—,

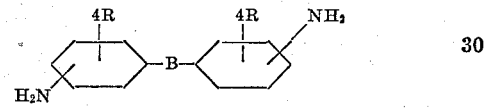

—CONH(CH$_2$)$_m$NHCO—, NH, S, O, (CH$_2$)$_m$, —HC=CH—, and N—N, where $m$ is 1 or 2 and R is one or more of a group consisting of hydrogen, alkyl, aryl, aralkyl, halogen, alkoxy, nitro, sulfonic, carboxylic, and CN.

9. The composition of matter represented by the formula:

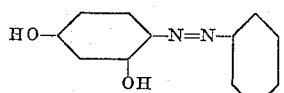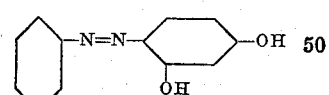
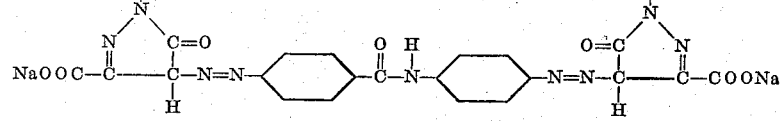

10. The compound represented by the formula:

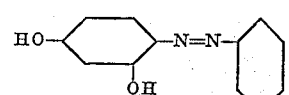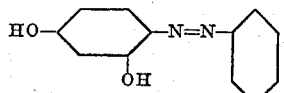
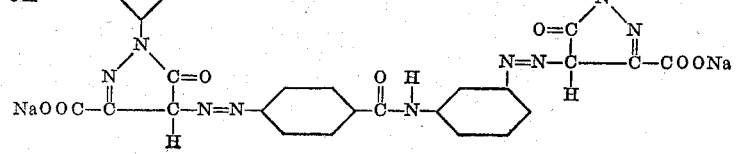

11. The compound represented by the formula:
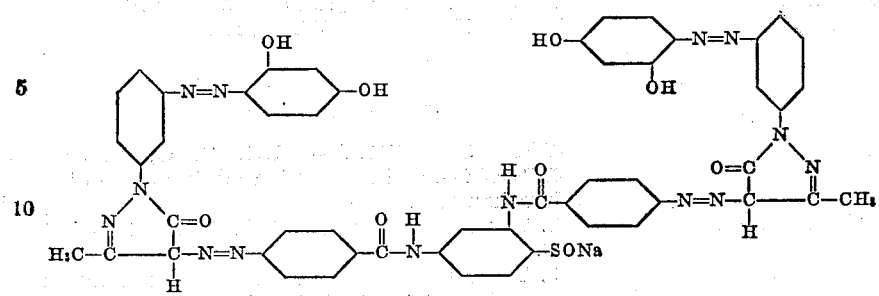
CHILES E. SPARKS.
STEWART C. HUSSEY.
WILLIAM B. REYNOLDS.
SWANIE S. ROSSANDER.